United States Patent
Hertwig et al.

(10) Patent No.: US 6,594,731 B1
(45) Date of Patent: Jul. 15, 2003

(54) METHOD OF OPERATING A STORAGE SYSTEM AND STORAGE SYSTEM

(75) Inventors: Axel Hertwig, Nürnberg (DE); Harald Bauer, Nürnberg (DE); Urs Fawer, Baden (CH); Paul Lippens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 299 days.

(21) Appl. No.: 09/640,728

(22) Filed: Aug. 17, 2000

(30) Foreign Application Priority Data

Aug. 21, 1999 (DE) .......................................... 199 39 764

(51) Int. Cl.⁷ .............................................. G06F 12/08
(52) U.S. Cl. ..................................................... 711/137
(58) Field of Search ......................................... 711/137

(56) References Cited

U.S. PATENT DOCUMENTS 4,980,823 A * 12/1990 Liu ............................. 711/136
5,828,860 A * 10/1998 Miyaoku et al. ............. 712/207

OTHER PUBLICATIONS

"Prefetching Using a Pageable Branch History Table" IBM Technical Disclosure Bulleting., BD. 28, NR. 8, Jan. 1986, pp. 3510–3511.
By J.D. Gindele, "Buffer Block Prefetching Method" IBM Technical Discloure Bulletin., BD. 20, NR. 2, Jun. 1977, pp. 696–697.

* cited by examiner

Primary Examiner—Reginald G. Bragdon
Assistant Examiner—Midys Inoa
(74) Attorney, Agent, or Firm—Gwennelle Le Pennec

(57) ABSTRACT

A method of operating a storage system comprising a main memory and a cache memory structured in address-related lines, in which cache memory can be loaded with data from the main memory and be read out by a processor as required. During the processor's access to data of a certain address in the cache memory, at which address certain data from the main memory which has a corresponding address is stored, a test is made to determine whether sequential data s stored at the next address in the cache memory; and this sequential data, if unavailable, can be loaded from the main memory in the cache memory via a prefetch, the latter only taking place when the processor accesses a predefined line section lying in a line.

11 Claims, 2 Drawing Sheets

METHOD OF OPERATING A STORAGE SYSTEM AND STORAGE SYSTEM

BACKGROUND OF THE INVENTION

The invention relates to a method of operating a storage system comprising a main memory and a cache memory structured in address-related lines, in which cache memory can be loaded with data from the main memory and be read out by a processor as required. During the access of the processor to data of a certain address in the cache memory, at which address certain data from the main memory which has a corresponding address is stored, a test is made to determine whether sequential data is stored at the next address in the cache memory; and this sequential data, if unavailable, can be loaded from the main memory in the cache memory via a prefetch.

In known storage systems, a plurality of data stored in the main memory are loaded in a cache memory already prior to their being called by an assigned processor, which runs a respective program. A cache memory is a high-speed buffer memory from which the necessary data is made available to the processor in a considerably faster way than from the main memory, which operates much more slowly. To ensure that in most cases the data required by the processor is available in the cache memory, the prefetch has come to be used. In the case of a prefetch operation, data which is not yet required by the processor for the moment, but which will probably shortly be required based on the processor access to the cache memory, has already previously been loaded from the main memory into the cache memory or a register, so that it is then available when the processor needs this data. A cache memory is subdivided into a plurality of lines which are typically also structured in columns, and each cache memory line is assigned a certain address line. In each line of the cache memory, a line of the main memory is written, and the line address of the cache memory corresponds to that of the main memory. Each line thus written has a certain length over. The mode of operation of such a storage system is such that when a hit occurs in the cache line N, which contains the data of the main memory address A, simultaneously a test is made to determine whether the data of the address <A plus line length> is available in the cache line N+1. Thus, assuming a hit in the cache line N, a check is invariably made whether the next line contains sequential data which the processor will probably need shortly. If this is not the case, a prefetch operation follows in which the data of the address <A plus line length> is loaded either in the cache memory or in an assigned register.

Basically, the use of prefetch for a cache memory increases the hit rate in the cache memory achieved by the processor. A high hit rate in its turn leads to a better performance of the system, because the memory access can be carried out without delay in case of a hit, whereas a miss leads to an access to the slower main memory and decelerates the system.

As a result of the use of prefetch, there are also disadvantages. Data is loaded from the main memory in the cache memory that may not be needed at all. This hazard particularly exists in the case of large line lengths that cause a large amount of data to be transmitted to the cache memory during a prefetch operation. Since each data transfer increases power consumption, power loss increases. Moreover, a conflict arises when during a prefetch operation a miss happens in the cache memory (the processor does not find the desired data there). The prefetch operation must then be either aborted or terminated before the necessary data can be loaded. In both cases additional delays arise, which reduce the efficiency of the system.

SUMMARY OF THE INVENTION

It is therefore an object of the invention to provide a method of operating a storage system that improves the efficiency of the system when a prefetch strategy is used and that reduces power consumption.

To solve this problem, a method is provided wherein a prefetch only takes place when the processor accesses a predefined line section that lies within a line.

During the test of whether sequential data is available, only if it is missing will a prefetch be carried out. Advantageously, according to the invention, a prefetch operation is not initiated until the processor accesses data that lies in a predefined line section within a line. The prefetch is based on the recognition that the probability that the data of the line sequentially following the processed line is needed by the processor is proportionally greater the further away in the line N the hit lies, or that the processor reads out data. Then the assumption is strengthened that the processor that reads out the data of the line N will shortly need the sequential data of the next line N+1 as it is stored in the main memory. As a result of the definition of a certain line section, which defines the part of a line which the processor is to access for a prefetch operation to actually occur, the above probability can be taken into account. If the processor accesses an address in the line that lies outside the predefined line section, a prefetch cannot (yet) be initiated.

As a result, the efficiency of the system can be enhanced, because a prefetch operation is not initiated until it is highly likely that the data fetched from the main memory is also really used. A prefetch is thus not automatically carried out each time it is established that the sequential data is not available, but only in preferred cases. This lowers the number of prefetch operations carried out during a program run, leading to a drop in power consumption, which is caused by the loading of data in the cache memory or its associated register. In contrast to a conventional prefetch strategy, the power consumption for the data transfer may be lowered by more than 30% because of improved system efficiency. A specially preferred application of this prefetch strategy lies in the area of mobile radio telephony, i.e., when the storage system is used in a mobile radio telephony terminal.

For simplicity, the line section can be defined in accordance with the invention by a predetermined line section address and can contain all the addresses of a line that are larger than or equal to the line section address. The address within the line which the processor has access to is compared to the line section address so as to establish via this comparison whether the processor now works within or without the predefined line section, so that a decision can be made whether a prefetch can be initiated or not. The placement or selection of the line section address ultimately depends on the power parameters of the processor (e.g., the processor clock and the rate of the transmission of data from the main memory), but also on the structure of the program which is run by the processor. In particular, the structure of the program determines whether the processor continuously processes the data—in essence, line-address by line-address or line by line—or whether during the running of the program there are many line jumps. Basically, the line section address is to be positioned so that in the majority of cases the prefetch operation has already been terminated before the data is accessed by the processor.

Each line of the cache memory can be subdivided into a plurality of line areas of a certain length, each of which is assigned its own line area address, and the line area address is then compared to the line section address. This takes into account the possibility of configuring a cache memory in various forms, one of which is the subdivision of each cache memory line or of the whole cache memory into a plurality of columns, the columns having different lengths depending on the cache memory configuration. In each line area can be written a certain amount of data which can be retrieved with the aid of the line area address, which is compared to the line section address to test the "type of job" of the processor within the line. The line section address can be given in the form of a number value, and a comparative value is determined on the basis of the line section address which the processor has just accessed. In accordance with an advantageous further embodiment of the inventive idea there may be provided a plurality of line sections of different lengths, and the line section to be taken into account for determining whether or not a prefetch to be performed is selected in dependence on the program section of a program to be run by the processor, i.e., the program section the processor is in at the time the prefetch is being determined. The line section or line section address, is changed by the program itself during the run time of the program. According to this embodiment of the invention, a dynamic change of the line section has thus been realized, so that it is possible for various program sections which each have different structures to define separate line sections and for each program section to separately define the initiating conditions for a prefetch. In this manner, various program structures may be responded to. If the decision about the initiation of the prefetch operation is implemented so that it can be configured by means of software, the dynamic change of this parameter is possible.

In addition to the foregoing method, the invention further relates to a data storage system comprising a main memory and a cache memory structured in a plurality of lines in which data read from the main memory can be written and read out as required by a processor, and a prefetch means for determining whether a prefetch of data from the main memory for transmission to the cache memory should take place, and for performing a prefetch. In the prefetch means at least one line section address is or can be determined which relates to the length of the line of the cache memory, by which means a line section in the line of the cache memory is defined. The prefetch means compares the line section address with an address in a line which the processor has access to, for determining whether the access takes place within the line section, and for performing a prefetch in dependence on the result of the comparison.

Each line of the cache memory can be subdivided into a plurality of line areas which have each having a separate line area address for comparison with the line section address (denoting what part of the line the processor has access to) and is compared by the prefetch means with the line section address to find out whether a prefetch is called for at all.

It has further turned out to be advantageous that when a plurality of line section addresses are determined or can be determined for determining a plurality of line sections, the line section address to be used for a comparison is selected in dependence on the program section of a program run by the processor during its access to the cache memory.

In order to avoid the need for data loaded from the main memory in a prefetch to be written directly in the cache memory, it has proved to be advantageous for the cache memory to include a register memory in which the prefetch data can be written by the prefetch means. When the prefetch data stored in the register memory of the cache memory is needed, it is transferred by the register memory to the processor and also stored in the cache memory for subsequent accesses.

When only one register memory is used, there may be the case where, after prefetch data has been written in the register memory, the program jumps to another cache memory line where a new prefetch becomes necessary. The old prefetch data in the register memory has not yet been read out, but can be re-used shortly when the program returns. Since there is only one register memory available, the old prefetch data is overwritten by the new prefetch. If the program returns again, a renewed prefetch may be necessary. In this instance, it has proved to be advantageous to provide a plurality of register memories in which the respective prefetch data of various prefetch operations can be written. Prefetch data to be written for the first time should be written in the register memory in which the oldest prefetch data is present, which is then overwritten.

BRIEF DESCRIPTION OF THE DRAWING

Further advantages, characteristic features and details of the invention are apparent from the exemplary embodiment described in the following and with reference to the drawings, in which.

DETAILED DESCRIPTION OF THE PREFERRED EMBODIMENT

Figure 1:
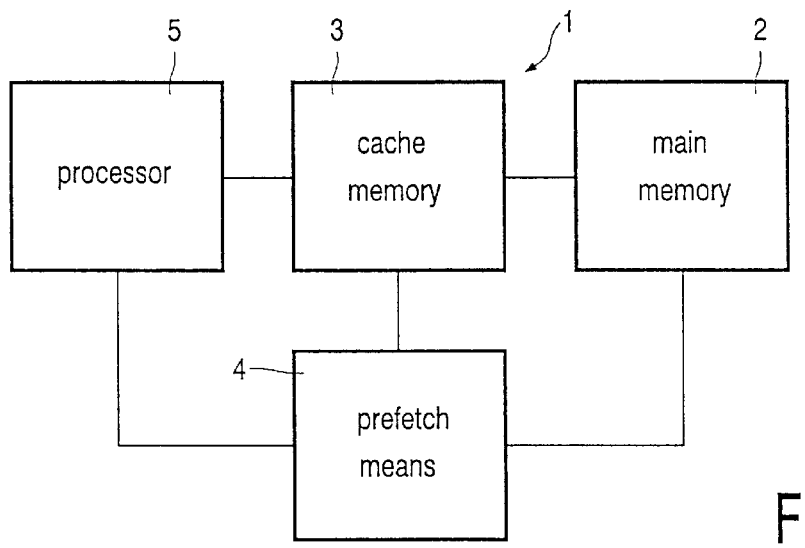
FIG. 1 shows a basic diagram of a storage system with assigned processor.

FIG. 1 shows a storage system 1 according to the invention, comprising a main memory 2 of high memory capacity but relatively low working speed. Assigned to this main memory 2 is a cache memory, which is a buffer memory that works considerably faster. Connected to the cache memory 3 and the main memory 2 is a prefetch means 4 by which it is determined, on the one hand, whether a prefetch is potentially required and whether the prefetch is in fact performed. Assigned to the storage system 1 is a processor 5, which in the example shown is connected to the cache memory 3 and the prefetch means 4 by a communication link. The processor 5, which runs a program and accesses data of the storage system 1, primarily accesses the very fast cache memory 3 in which a great part of the data stored in the main memory 2 has been written in advance. By transferring the data to the memory 3, the data, if needed, is assured of being available to the processor at a sufficient speed. However, if a certain address line which the processor 5 would like to have access to is not available in the cache memory 3, it is loaded from the main memory 2 to the cache memory 3 and from there transferred to the processor 5.

The overall configuration shown in FIG. 1 (which is preferably provided on a common chip for fast data transfer and low power consumption), is also arranged, as described previously, for performing a prefetch. Within the framework of a prefetch, when the processor has access to a cache memory line ("cache line") and to a certain address on the line, logic tests whether a next line containing sequential data is also already present in the cache memory 3. If this is not the case, the missing line is transmitted from the main memory 2 to the cache memory 3 via the prefetch means 4, or such transmission is initiated.

Figure 2:
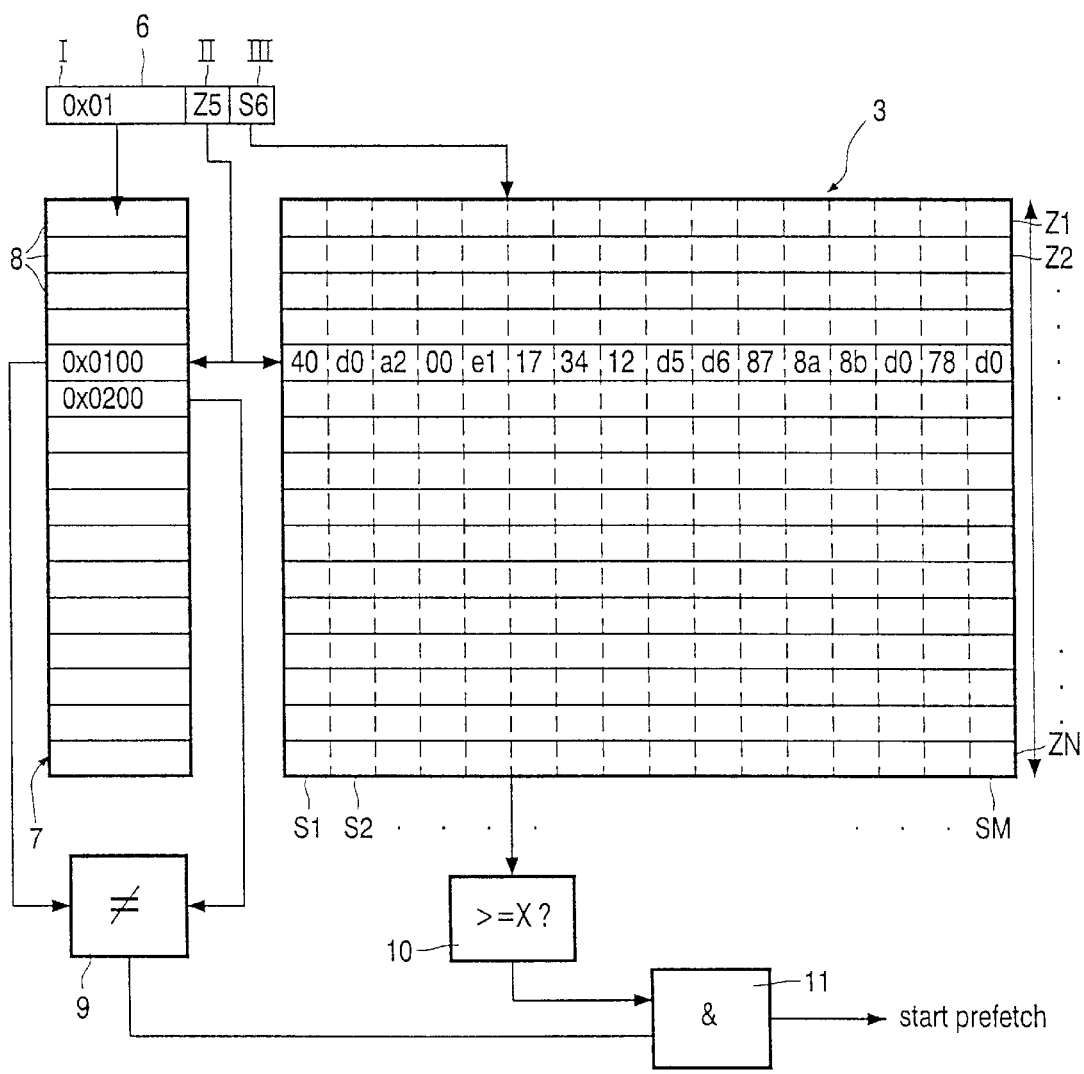
FIG. 2 shows a basic diagram of the structure of a cache memory of a first embodiment to represent the operations for initiation of a prefetch.

FIG. 2 shows in the form of a basic diagram a possible cache memory configuration and is used for explaining the operations for initiating a possible prefetch. The processor 5 delivers an address 6 to the cache memory, which indicates what data is needed by the processor. The address 6 consists of a total of three address sections I, II and III. The first address section I denotes the page address of the main memory to which address the data of a cache memory line is assigned. The cache memory 3 includes a respective cache address directory 7 in which page addresses 8 corresponding to the page addresses of the main memory are stored. The cache address directory 7 is addressed by the address section II and the address section I is compared to the contents of the cache address directory. In this case the page address is "0x01".

The address section II, which represents a line address, denotes on what line of the cache memory 3 the data referred to by the address section I are available. This information thus forms a link between the cache address directory and the cache memory. In the example shown this address information is "Z5". Finally, the information in address section III denotes the address of the particular data which is to be read out within the line. As shown in FIG. 2, the cache memory 3 is subdivided into a plurality of lines Z1, Z2, ... ZN and also into a plurality of columns S1, S2, ..., SM. The information in the address part III reads "S6" and thus designates the information in column S6 as data to be read out.

In the example shown, the data which is stored in the cache memory 3 in line Z5 is accessed, and the information to be read out is located in column block S6. The information to be read out reads "17" in the example shown.

If the cache memory receives the address 6 from the processor, a test is automatically performed testing whether the next data stored in the next line in the main memory is already available in the cache memory 3. Thus, a test is made whether the data line after the address "0x01/Z5", that is the line "0x01/Z6" is also already available in the cache memory 3. This is done by testing the cache directory 7 in step 9. If it is established that the line is present, the data is available; if this line is missing, a prefetch may be necessary to load this line from the main memory.

To actually initiate a prefetch operation, not only is the searched line is to be absent, but also a further condition is to be satisfied. This further condition is that the processor is to access an address that lies within a predefined line section ("cache line section") in the cache memory 3. In the example shown this line section is determined on the basis of the cache line section address, represented as a parameter "X". The line section that is defined hereby comprises all the addresses ("cache line area addresses") of one of the lines Z1, Z2, ... ZN which are equal to or larger than the line section address. If, for example, the line section address read X=S5, the line section would comprise all the columns ("cache line areas") S5, S6, ... SM. When the test is performed, if the address S6 read by the processor lies outside this line section, no prefetch is performed. If it lies inside, a prefetch is performed. This condition is tested in step 10. If the conditions of the steps 9 and 10 are both satisfied, which is tested in step 11, a prefetch is performed; the corresponding data is read from the main memory and transferred to the cache memory 3. The steps 9, 10 and 11 are carried out in the prefetch means 4 using logic and/or software. It should be pointed out that the line section value X may be set to have any value. For example, if any given processor access is allowed to give rise to a prefetch, as in conventional practice, the line section value X is set to S1 and the line section then comprises all the column sections. If no prefetch is to be performed at any time, the line section value X is set, for example, to 0.

Figure 3:
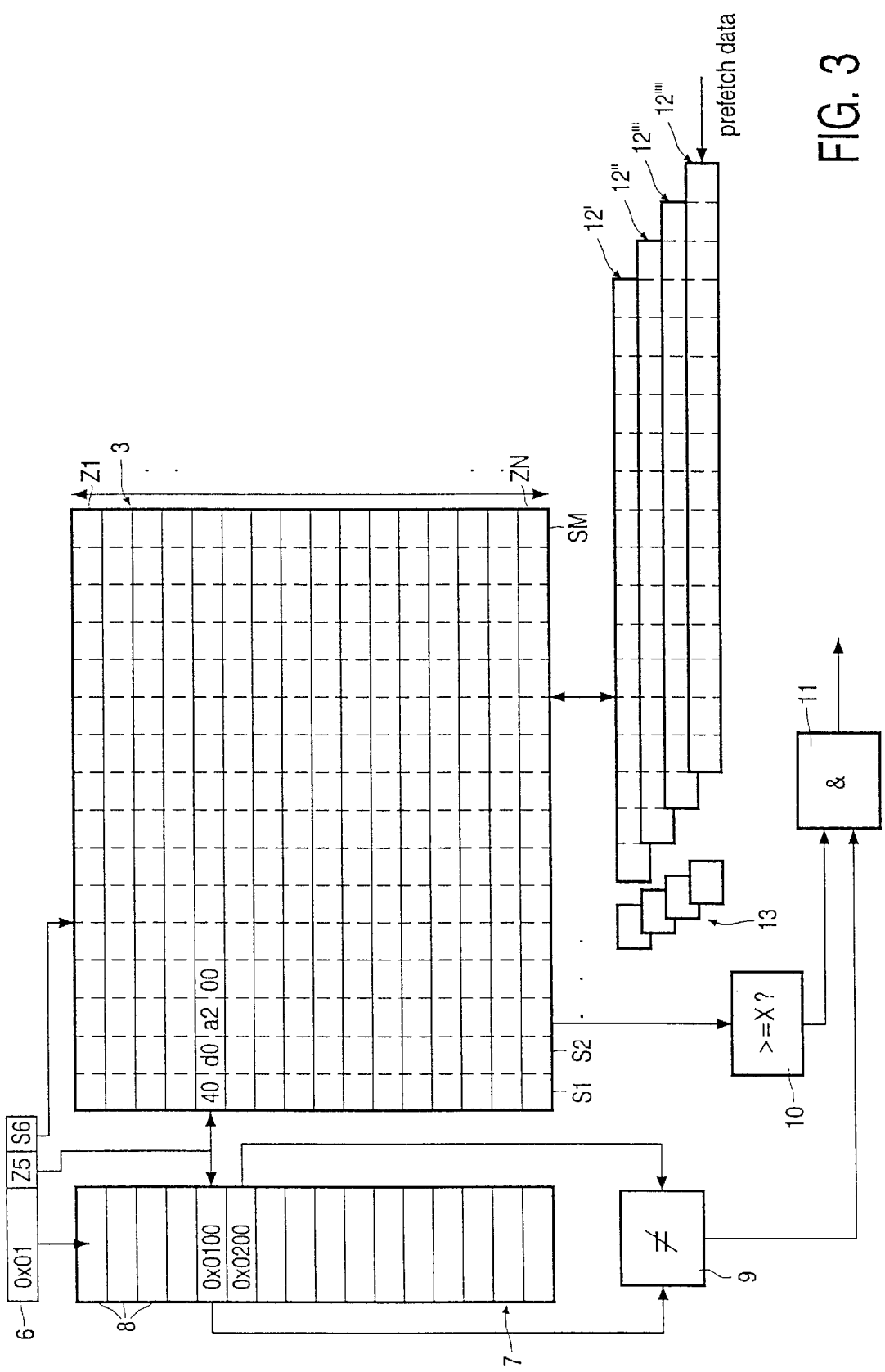
FIG. 3 shows a cache memory structure in accordance with FIG. 1 having a plurality of register memories assigned to the cache memory.

FIG. 3 shows the configuration of a cache memory in accordance with FIG. 2, but here a plurality of register memories 12', 12", 12''', 12'''' are assigned to the cache memory 3, and the register memories have written to them data which is loaded from the main memory as the result of a prefetch. The register memory 12', ..., 12'''' is assigned a corresponding cache register address directory 13 in which respective addresses are written corresponding to the main memory addresses. By using a plurality of register memories, it is possible to hold prefetch data for a certain period of time without it being overwritten during a new prefetch, as would be the case if only one register memory were available. The writing strategy may be such that in the case of new prefetch data, the register memory is overwritten is always the one that contains the oldest prefetch data. As a result, when programs are processed in which line jumps often occur, data that has been prefetched but was not needed because of the line jump is maintained for a certain period of time until it is overwritten, because there is a possibility that the program will again jump back to the original line and that the data will still be needed. Overwriting by a next prefetch cannot occur since the next prefetch data would be written in another register memory.

Finally it should be pointed out that the cache memory configurations shown are merely shown by way of example. The cache memory may have any structure. For example, the memory may be arranged as a direct mapping cache memory or as a two-way set associative cache memory.

What is claimed is:

1. A method of operating a storage system having a cache memory and a main memory, the storage system being accessed by a processor, the method comprising:
   the processor accessing data stored as a cache line in the cache memory from the main memory, the data being referenced by a given address;
   testing whether the next data referenced by a next address in a sequence is also stored in the cache memory; and
   if the next data is not stored in the cache memory, making a decision to perform a prefetch of the next data from the main memory to the cache memory only if the processor accesses a predetermined cache line section of the cache line wherein the cache section is dynamically adjusted based on a current status of operation of the processor.

2. A method as claimed in claim 1, wherein: the cache line section is defined by a cache line section address to contain all the addresses of a cache line that are larger than or equal to the cache line section address, and testing comprises comparing an address accessed by the processor within the cache line to the cache line section address.

3. A method as claimed in claim 2, wherein: each cache line is subdivided into a plurality of cache line areas of a given length to each of which is assigned its own cache line area address, and the cache line area address accessed by the processor is compared to the cache line section address.

4. A method as claimed in claim 2, wherein: the cache line section address is given in the form of a numerical value.

5. A method as claimed in claim 1, wherein a plurality of different cache line section lengths are determined, and the cache line section length used to make a prefetch determination whether or not a prefetch is to be performed is selected based on which of multiple different program sections the processor is running in when the prefetch determination is being made.

6. A storage system accessed by a processor, comprising:

a main memory;

a cache memory; and a controller for testing whether a next data referenced by a next address in a sequence is also stored in the cache memory and, if the next data is not stored in the cache memory, making a decision to perform a prefetch of the next data from the main memory to the cache memory only if the processor accesses a predetermined cache line section of the cache line wherein the cache section is dynamically adjusted based on a current status of operation of the processor.

7. A storage system as claimed in claim 6, wherein each cache line of the cache memory is subdivided into a plurality of cache line areas which have each a separate cache line area address, further comprising means for performing a comparison between cache line area addresses and cache line section addresses.

8. A storage system as claimed in claim 7, wherein a cache line section address to be used for the comparison is selected from among a plurality of cache line section addresses in dependence on a program section of a program run by the processor during access to the cache memory.

9. A storage system as claimed in claim 6, wherein: the cache memory includes a register memory in which prefetch data is written by the controller.

10. A storage system as claimed in claim 9, wherein: a plurality of register memories are provided in which the respective prefetch data of various prefetch operations is written.

11. A storage system as claimed in claim 10, wherein: when prefetch data to be written for the first time is written in the register memories, prefetch data most recently written in the register memories is not overwritten but remains available, while prefetch data least-recently written in the register memories is overwritten.

* * * * *